(12) United States Patent
Nomura

(10) Patent No.: US 11,700,341 B2
(45) Date of Patent: Jul. 11, 2023

(54) IMAGE INSPECTION APPARATUS AND MISALIGNMENT MEASUREMENT METHOD

(71) Applicant: KONICA MINOLTA, INC., Tokyo (JP)

(72) Inventor: Shoichi Nomura, Machida (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 17/940,453

(22) Filed: Sep. 8, 2022

(65) Prior Publication Data

US 2023/0007142 A1 Jan. 5, 2023

Related U.S. Application Data

(63) Continuation of application No. 17/527,349, filed on Nov. 16, 2021, now Pat. No. 11,477,341.

(30) Foreign Application Priority Data

Dec. 3, 2020 (JP) ................................ 2020-200659

(51) Int. Cl.
*G06F 3/12* (2006.01)
*H04N 1/32* (2006.01)
*H04N 1/00* (2006.01)

(52) U.S. Cl.
CPC ..... *H04N 1/32267* (2013.01); *H04N 1/00129* (2013.01); *H04N 1/00249* (2013.01); *H04N 1/00352* (2013.01)

(58) Field of Classification Search
CPC .......... H04N 1/32267; H04N 1/00129; H04N 1/00249; H04N 1/00352
See application file for complete search history.

(56) References Cited

U.S. PATENT DOCUMENTS

| 2012/0133998 A1* | 5/2012 | Okada | H04N 1/3263 358/498 |
| 2015/0104201 A1* | 4/2015 | Takahashi | G03G 15/234 399/15 |
| 2016/0234398 A1* | 8/2016 | Itou | H04N 1/0432 |

(Continued)

FOREIGN PATENT DOCUMENTS

| JP | H11266343 A | 9/1999 |
| JP | 2020057902 A | 4/2020 |

*Primary Examiner* — Moustapha Diaby
(74) *Attorney, Agent, or Firm* — Buchanan Ingersoll & Rooney PC

(57) ABSTRACT

An image inspection apparatus includes a first reader and a second reader that acquire read images by respectively reading one side and the other side of a sheet having an image printed thereon, a first background material and a second background material provided at positions as the backgrounds of the sheet in reading by the first reader and the second reader respectively, and a hardware processor that acquires sheet outline information from the read images and measures misalignment of the image with respect to the sheet based on the acquired sheet outline information. The hardware processor acquires read images with the first background material and the second background material having different densities, and acquires sheet outline information of one read image by estimating the sheet outline information of the one read image based on sheet outline information of the other of the read images.

19 Claims, 9 Drawing Sheets

(56) References Cited

U.S. PATENT DOCUMENTS

2019/0149701 A1\* 5/2019 Yamamoto ............... H04N 1/62
358/505
2022/0182509 A1 6/2022 Nomura \* cited by examiner

IMAGE INSPECTION APPARATUS AND MISALIGNMENT MEASUREMENT METHOD

CROSS-REFERENCE TO RELATED APPLICATIONS

The entire disclosure of Japanese Patent Application No. 2020-200659 filed on Dec. 3, 2020 is incorporated herein by reference in its entirety.

BACKGROUND

Technological Field

The present invention relates to an image inspection apparatus and a misalignment measurement method.

Description of the Related Art

As a means of adding values to printed materials, an image forming apparatus that uses a fifth color toner in addition to the usual YMCK color materials (toner in electrophotography; hereinafter referred to as "toner") is known. In particular, printing using white toner is increasing, and black sheets are effective sheets to bring out the effect of white toner.

In order to adjust the deviation of the image position with respect to the sheet in the image forming apparatus, for example, small marks (images for position measurement, called Tombo) that do not affect the image content are printed at the four corners of the sheet, and distances between the sheet outline (sheet edges) and the marks are measured by reading the positions with a reader. This technology is known to adjust the position of the image to the sheet (image position adjustment) during printing. Generally, the background material of the reader is black to make it easier to read white sheet, so it is difficult to read the sheet outline of black sheet. Therefore, there are some devices that can switch the density of the background material appropriately according to the sheet used for printing. For example, JP 2020-57902 A describes a background material that can switch between multiple background colors, and switches the color of the background material appropriately according to the color of the sheet. Also, JP H11-266343 A discloses a method of constructing a texture pattern on the background material capable of identifying the sheet.

SUMMARY

There is also an adjustment method for image position adjustment (called real-time image position adjustment) in which, for example, a mark is printed on each of the four corners of the sheet in a job (print job) (at the position where the sheet will be separated from the image content when it is cut in the post-process), the position of the sheet outline and the mark are read by a reader and the distance between them is measured, and based on the measurement results, fluctuations in image position during a job is suppressed. In this case, the sheet may be conveyed and printed from different sheet trays for each page in a single job, for example, there may be a job where one sheet tray is for white sheet and the other for black sheet. In this case, if the sheet color is frequently switched from one page to another, the technology of JP 2020-57902 A has a problem that it becomes difficult to control the switching of the background material. Therefore, the background material is fixed to either white or black during the job, but if the density of the sheet and the background material are similar, the possibility of errors such as errors in reading the sheet outline increases. As a result, for example, when the system is used in combination with a control that updates the image position adjustment value during a printing job to detect sudden misalignment (positional deviation) of image during the job and eliminate the printed material concerned or resolve the image misalignment, the system excessively detects image misalignment on pages where the density of the sheet and the background material are similar. As a result, there are problems such as excessive sheet loss and variations in adjustment values during the job, resulting in unstable image positions.

The background material described in JP H11-266343 A does not have the above-mentioned problem, but the extraction of the sheet outline is complicated. Furthermore, though the printed image may be inspected or breakdown of the image forming apparatus may be diagnosed or predicted on the basis of the read image by the reader, the technology described in JP H11-266343 A has the problem that the texture of the background material becomes transparent when the sheet is thin and makes the background material transparent.

The present invention was made in consideration of these issues, and aims to enable easy and reliable acquisition of sheet outline information without switching the background material during a job.

To achieve at least one of the abovementioned objects, according to an aspect of the present invention, an image inspection apparatus reflecting one aspect of the present invention is an image inspection apparatus including: a first reader that acquires a first read image by reading one side of a sheet so as to include a background, the sheet having an image printed thereon; a first background material that is provided at a position which serves as the background of the sheet in reading of the sheet by the first reader; a second reader that acquires a second read image by reading the other side of the sheet so as to include a background; a second background material that is provided at a position which serves as the background of the sheet in reading of the sheet by the second reader; and a hardware processor that acquires sheet outline information of the sheet from the first read image and the second read image, and measures misalignment of the image with respect to the sheet based on the acquired sheet outline information, wherein the hardware processor acquires a first read image and a second read image by causing each of the first background material and the second background material to have a different density, and acquires sheet outline information of one read image that is one of the first read image and the second read image by performing estimation of estimating the sheet outline information of the one read image based on sheet outline information of the other of the first read image and the second read image.

To achieve at least one of the abovementioned objects, according to another aspect of the present invention, a misalignment measurement method reflecting one aspect of the present invention is a misalignment measurement method in an image inspection apparatus, the method including acquiring a first read image and a second read image by causing each of a first background material and a second background material to have a different density, and acquiring sheet outline information of one read image which is one of the first read image and the second read image by estimating the sheet outline information of the one read image based on sheet outline information of the other of the first read image and the second read image, wherein the image inspection apparatus includes: a first reader that acquires the first read image by reading one side of a sheet having an image printed thereon so as to include a background; the first background material that is provided at a position which serves as the background of the sheet in reading the sheet by the first reader; a second reader that acquires the second read image by reading the other side of the sheet so as to include a background; and the second background material that is provided at a position which serves as the background of the sheet in reading the sheet by the second reader, and the image inspection apparatus acquires the sheet outline information of the sheet from each of the first read image and the second read image, and measures misalignment of the image with respect to the sheet based on the acquired sheet outline information.

BRIEF DESCRIPTION OF THE DRAWINGS

The advantages and features provided by one or more embodiments of the invention will become more fully understood from the detailed description given hereinafter and the appended drawings which are given by way of illustration only, and thus are not intended as a definition of the limits of the present invention, and wherein.

DETAILED DESCRIPTION OF EMBODIMENTS

Hereinafter, one or more embodiments of the present invention will be described in detail with reference to the drawings. However, the scope of the invention is not limited to the disclosed embodiments or the illustrated examples.

[Configuration of Image Forming Apparatus]

First, the configuration of an image forming apparatus 100 in an embodiment of the present invention will be described.

Figure 1:
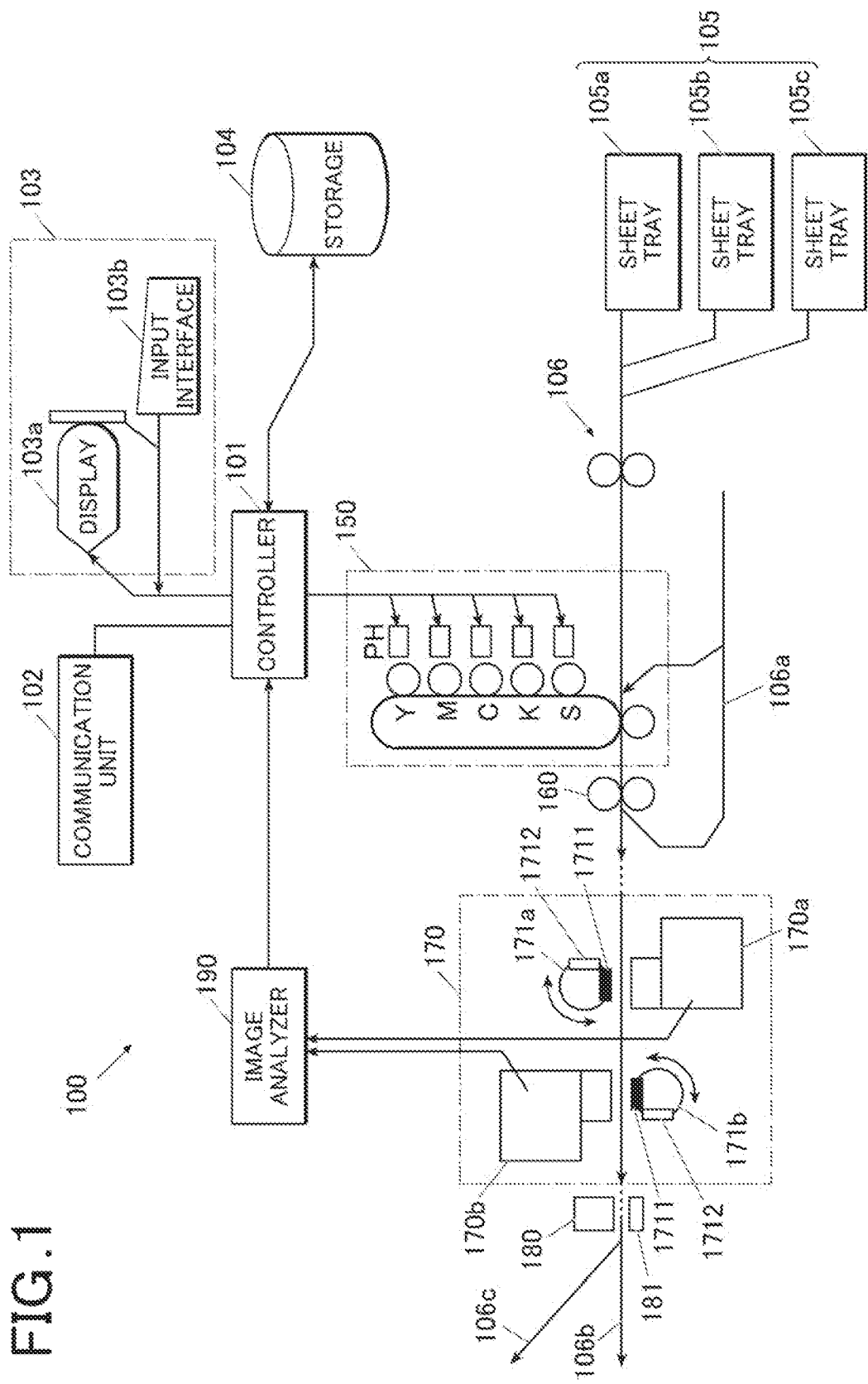
FIG. 1 is a block diagram showing the configuration of an image forming apparatus.

FIG. 1 shows the main configuration of the image forming apparatus 100.

As shown in FIG. 1, the image forming apparatus 100 includes a controller 101, a communication unit 102, an operation display unit 103, a storage 104, a sheet feeding unit 105, a conveyance unit 106, an image former 150, a fixing unit 160, a reading unit 170, a colorimeter 180, an image analyzer 190, and the like.

The controller 101 is equipped with a CPU (Central Processing Unit), ROM (Read Only Memoiy), RAM (Random Access Memory), etc. The CPU of the controller 101 reads a program according to the processing contents from the ROM, expands it to the RAM, and centrally controls the operation of each part of the image forming apparatus 100 in cooperation with the expanded program.

The communication unit 102 is configured by including a communication control card such as a LAN (Local Area Network) card, for example, and is used to transfer various data to and from external devices connected to a communication network such as a LAN or WAN (Wide Area Network).

The operation display unit 103 has a display 103a, such as a liquid crystal display or organic EL display, and an input interface 103b configured by including various operation keys, a touch panel superimposed on the screen of the display 103a, and a numeric keypad. The operation display unit 103 displays various information in the display 103a, and also converts the user's input operations to the input interface 103b into operation signals, which are output to the controller 101.

The storage 104 is composed of, for example, a non-volatile semiconductor memory (so-called flash memory), a hard disk drive, or the like. The storage 104 stores various data including various setting information for the image forming apparatus 100, job information (setting information of a job and image data of the job), and the like. The job setting information includes information on the sheet trays 105a to 105c for each page used in the job, the color and size of the sheet, the sheet type, the total number of printed sheets, and information on adjustment functions performed simultaneously or in conjunction with the job. The storage 104 also stores information on the sheet set in the sheet trays 105a to 105c (size, color, type, etc.). The storage 104 also stores adjustment values for each adjustment item of image position adjustment (front and back adjustment values, respectively), reading position correction values to be described later, and the like.

The sheet feeding unit 105 feeds sheets stored in the sheet trays 105a to 105c according to instructions from the controller 101.

The conveyance unit 106 has a sheet feed path and a plurality of conveyance roller pairs such as resist roller pairs, and conveys the sheet fed from the sheet feeding unit 105 in the image forming apparatus 100. The conveyance unit 106 has a reversing path 106a, and can reverse the front and back of the sheet and convey it to the image former 150. The conveyance unit 106 has a sheet discharge path 106b for discharging the printed matter and a sheet waste path 106c for discharging waste sheet.

The image former 150 prints an image on the sheet based on the job setting information and the image data to generate the printed matter. In this embodiment, the image former 150 has an image forming unit for each color of Y (yellow), M (magenta), C (cyan), K (black), and S (specific color; white in this embodiment), and is capable of printing using white toner in addition to images using normal Y, M, C, and K toner.

The fixing unit 160 fixes the toner image printed on the sheet with heat and pressure.

In FIG. 1, the image former 150 is illustrated as an image former of the so-called electrophotographic method, but the printing method is not limited thereto, and the image former 150 may be an image former of other printing methods such as, for example, the inkjet method.

The reading unit 170 reads the printed matter printed by the image former 150 and fixed by the fixing unit 160, acquires the read image data (read image), and outputs it to the image analyzer 190. The reading unit 170 is configured, for example, by a color scanner or the like. The reading unit 170 is located downstream of the image former 150 and the fixing unit 160, and is configured to read images during sheet conveyance.

The reading unit 170 consists of a reader 170a (first reader) that reads an image on one side of the sheet to obtain a read image (first read image), and a reader 170b (second reader) that reads an image on the other side of the sheet to obtain a read image (second read image). The reader 170a and the reader 170b are respectively provided with a background material 171a (first background material) and a background material 171b (second background material) at opposite positions across the sheet feed path. Each of the background materials 171a and 171b, for example, has two surfaces (black surface 1711 and white surface 1712) with different densities (colors), as shown in FIG. 1, and can be rotated by a drive source not shown in the figure to switch the background surface (the surface facing the corresponding reader) to black or white when reading the sheet.

The reading size by the reading unit 170 is larger than the sheet size, and it is configured to be able to read a wider area than the sheet size, including the sheet outline and the area of the background material in the vicinity.

In addition, a colorimeter 180 is provided downstream in the sheet conveyance direction of the reading unit 170. The colorimeter 180 is composed of a spectrophotometer or the like, and is capable of high-precision color measurement. The colorimeter 180 has a background material 181 across the sheet feed path. The background material 181 is composed of, for example, white color.

The image analyzer 190 analyzes the read images output by the reading unit 170, calculates the amount of misalignment with respect to the sheet of the image (image contents) printed on each of the surface and the back of the sheet, the adjustment value of the misalignment, the adjustment value of the color of the images, and the like, and outputs the results to the controller 101. The image analyzer 190 is realized, for example, by cooperation between the CPU of the controller 101 and a program stored in ROM.

The controller 101, the reading unit 170, and the image analyzer 190 constitute the image inspection apparatus of the present invention, which reads a sheet having an image printed thereon and acquires read images, acquires sheet outline information from the acquired read images, and measures misalignment of the printed image based on the acquired sheet outline information. Also, the controller 101 and the image analyzer 190 constitute a measurement unit of the present invention.

[Operation of Image Forming Apparatus]

Next, the operation in the image forming apparatus 100 will be described.

As described above, in the case where the backgrounds (background surfaces of the background materials 171a and 171b) of the reader 170a and the reader 170b when reading the sheet are both fixed to the black surface 1711 or the white surface 1712, the sheet outline may not be read depending on the density of the sheet used for printing. On the other hand, it may be difficult to control the switching of the background surfaces of background material 171a and background material 171b according to the density of the sheet used for each page in a job. Therefore, in the present embodiment, when executing a job, the background material 171a and the background material 171b are controlled by the controller 101 so that their densities (referring to the densities of the background surfaces) are different, i.e., the background surface of one background material is the black surface 1711 and the background surface of the other background material is the white surface 1712. However, in this case, depending on the density of the sheet, the sheet outline may not be read by the reader 170a or the reader 170b.

Figure 2A:
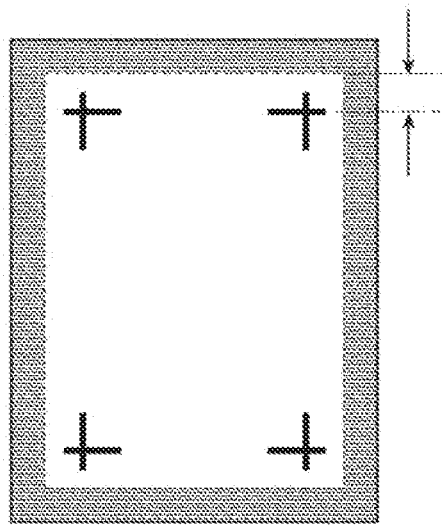
FIG. 2A is a view showing an example of a read image when white sheet is used as the sheet for printing and black is used as the background material.
Figure 2B:
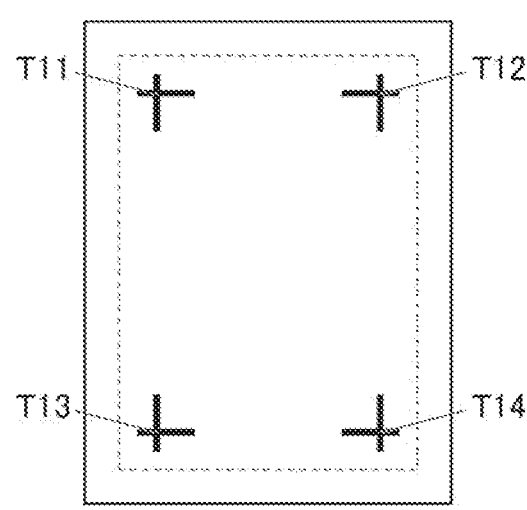
FIG. 2B is a view showing an example of a read image when white sheet is used as the sheet for printing and white is used as the background material.

For example, when a white sheet is used as the sheet for printing, the sheet outline (indicated by the dotted line) is clear in the read image of the reader whose background surface is set to the black surface 1711, as shown in FIG. 2A, but in the read image of the reader whose background surface is set to the white surface 1712, as shown in FIG. 2B, the sheet outline is not clear because the density difference between the background and the sheet outline (indicated by the dotted line) is small.

Figure 3A:
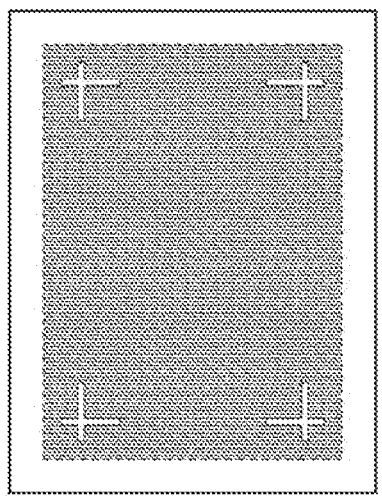
FIG. 3A is a view showing an example of a read image when black sheet is used as the sheet for printing and white is used as the background material.
Figure 3B:
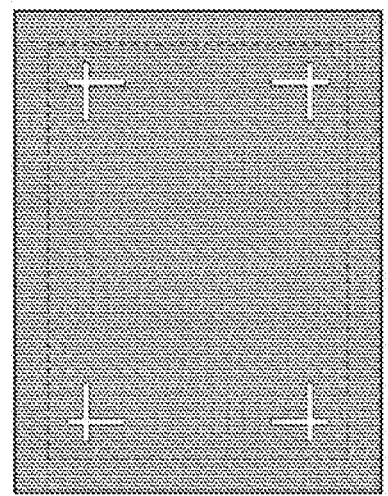
FIG. 3B is a view showing an example of a read image when black sheet is used as the sheet for printing and black is used as the background material.

On the other hand, when a black sheet is used as the sheet for printing, the sheet outline (indicated by the dotted line) is clear in the read image of the reader whose background surface is set to the white surface 1712, as shown in FIG. 3A, but the sheet outline is not clear in the read image of the reader whose background surface is set to the black surface 1711, as shown in FIG. 3B because the density difference between the background and the sheet outline (indicated by the dotted line) is small.

Therefore, in this embodiment, the reading result of the sheet outline by one reader is estimated and acquired based on the reading result of the sheet outline of the other reader.

Here, since the distance between the reader 170a and the reader 170b is narrow and the sheet-through path is simple, it can be predicted that the sheet that has passed through the reader 170a will maintain its state and pass through the reader 170b after a certain time. Also, since the sheet outlines read by the reader 170a and the reader 170b are obtained by reading the same sheet with almost no interval between them, it can be regarded that the same sheet outline was read (in fact, the sheet outline of the reader 170a and the sheet outline of the reader 170b are mirror images of each other).

Therefore, when it is difficult (or impossible) to extract the sheet outline information from the read image read by one of the readers 170a and 170b, the sheet read by the other reader is considered to have passed through the one of the readers at a certain interval, and the coordinates of each vertex of the sheet outline information obtained from the read image of the other reader are converted to the position of the mirror image, and the outline connecting the converted vertices is shifted based on the difference in the reading positions of the sheet in the reader 170a and the reader 170b, and is estimated to be the sheet outline information read by the one reader.

In this case, it is necessary to know precisely the difference in the position of the sheet outline with respect to the reading area of the reader 170a and the reader 170b.

Specifically, it is necessary to know the shift amount in the sheet feed direction ($\Delta y$) and the shift amount in the sheet feed crossing direction ($\Delta x$) of the sheet outline in the read image of the reader 170a and the reader 170b. This can be determined from the results of correctly measuring the sheet outline information from the read images of both the reader 170a and the reader 170b. Furthermore, it is desirable that the magnification difference between the two readers is also ascertained and converting is made similarly. Since the sheet-feed characteristics vary depending on the sheet characteristics, it is desirable to obtain and store in the storage 104 the above-mentioned $\Delta x$ and $\Delta y$ for each sheet type.

Figure 4:
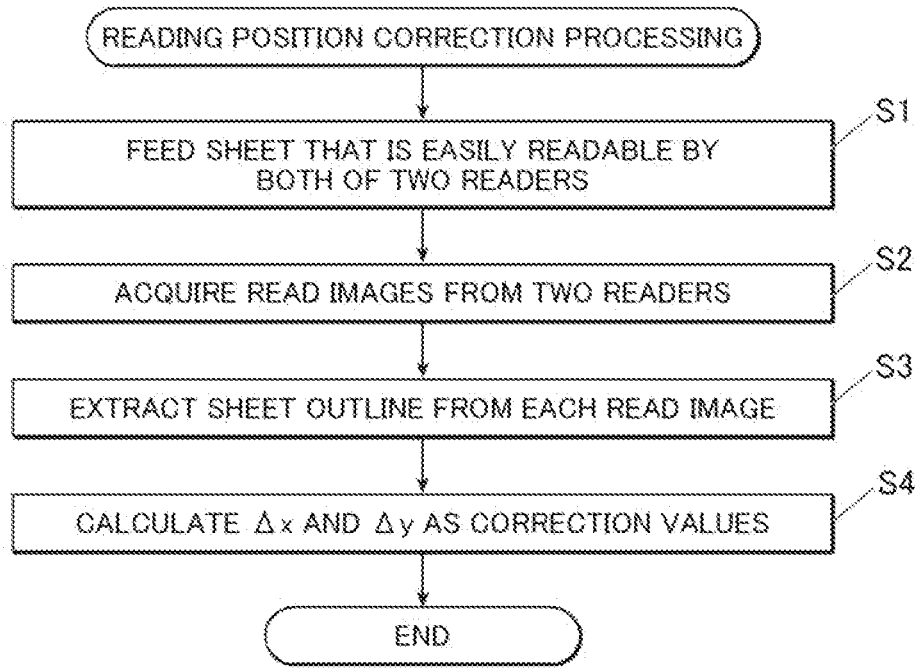
FIG. 4 is a flowchart showing the flow of reading position correction processing executed by the controller in FIG. 1.

FIG. 4 is a flowchart showing the flow of the reading position correction processing for calculating, as correction values, the shift amount $\Delta y$ in the sheet feed direction and the shift amount $\Delta x$ in the sheet feed crossing direction of the sheet outline in the read images acquired by reading the same sheet with the reader 170a and the reader 170b. The reading position correction processing is performed by cooperation between the CPU of the controller 101 and the program stored in the ROM.

First, the controller 101 feeds, from the sheet feeding unit 105, a sheet on which the sheet outline is easily read by both the reader 170a and the reader 170b (Step S1).

In step S1, a gray sheet having a density difference from both the black surface 1711 and the white surface 1712 may be fed from the sheet feeding unit 105 so that the sheet outline can be easily read by both the reader 170a and the reader 170b. Alternatively, the background surface of both the reader 170a and the reader 170b may be set to the black surface 1711 and a white sheet may be fed. Or, the background surface of both the reader 170a and the reader 170b may be set to the white surface 1712 and a black sheet may be fed.

Next, the controller 101 causes both the reader 170a and the reader 170b to read the fed sheet and acquire read images (Step S2).

Next, the controller 101 extracts the sheet outline information from each read image of the reader 170a and the reader 170b (Step S3).

For example, searching is performed from each end of the read image, and the edge whose density difference from the end of the read image is a predetermined value or more is extracted as the sheet outline information.

Then, the controller 101 calculates the shift amount $\Delta y$ in the sheet feed direction and the shift amount $\Delta x$ in the sheet feed crossing direction of the sheet outline information in the read images of the reader 170a and the reader 170b as correction values and stores them in the storage 104 (Step S4), and ends the reading position correction processing.

Figure 5:
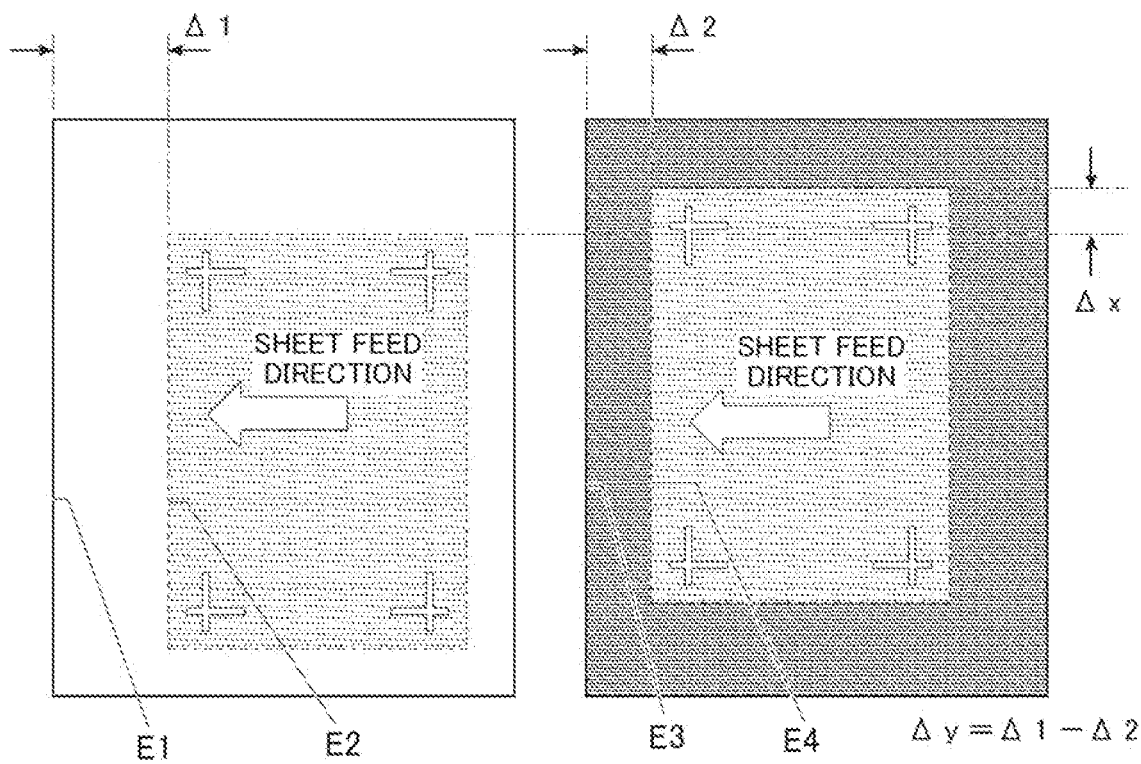
FIG. 5 is a diagram to illustrate the correction values calculated by the reading position correction processing.

In step S4, for example, as shown in FIG. 5, the controller 101 calculates the distance $\Delta 1$ between the end E1 in the sheet feed direction of the read image acquired by one reader and the end E2 in the sheet feed direction of the sheet outline information extracted from the read image, and the distance $\Delta 2$ between the end E3 in the sheet feed direction of the image obtained by performing mirror image processing to the read image acquired by the other reader and the end E4 in the sheet feed direction of the sheet outline information extracted from the read image to which the mirror image processing was performed. Then, $\Delta 1 - \Delta 2$ is calculated as the shift amount $\Delta y$ in the sheet feed direction. The controller 101 also calculates the shift amount $\Delta x$ in the sheet feed crossing direction between the sheet outline information extracted from the read image acquired by one reader and the sheet outline information extracted from the image obtained by performing mirror image processing to the read image acquired by the other reader.

Although the above explanation assumes that mirror image processing is performed, it is sufficient to know the positional relationship between the edges (sides) of the corresponding sheet outlines in the two read images, and it is not necessary to perform mirror image processing. In step S4, the shift amount $\Delta x$ and $\Delta y$ are calculated, but the correction values for magnification and slope may be calculated in the same way.

Since the interval between the readers 170a and 170b is short, once the correction values are obtained for one sheet, the correction values can be diverted to other sheets, but it is preferable to measure for each sheet size and type (fine paper, coated paper, etc.) and store them in the storage 104.

In addition, the controller 101 measures the densities of the background and the sheet from the read images acquired from both the reader 170a and the reader 170b (i.e., read images of both sides) by the image analyzer 190 during the job. When the difference in density between the background and the sheet in both read images is greater than a predetermined value (i.e., when sheet outline information can be extracted from the read images of both the reader 170a and the reader 170b), the above shift amounts $\Delta x$ and $\Delta y$ may be automatically calculated, and the correction values that have already been calculated and stored in the storage 104 may be updated. The shift amounts $\Delta x$ and $\Delta y$ calculated in the past may be accumulated and stored in the storage 104 or RAM, and the average values of the accumulated shift amounts $\Delta x$ and $\Delta y$ may be stored in the storage 104 as the correction values.

Next, the operation of the image forming apparatus 100 when printing based on the job is actually performed will be described.

Figure 6:
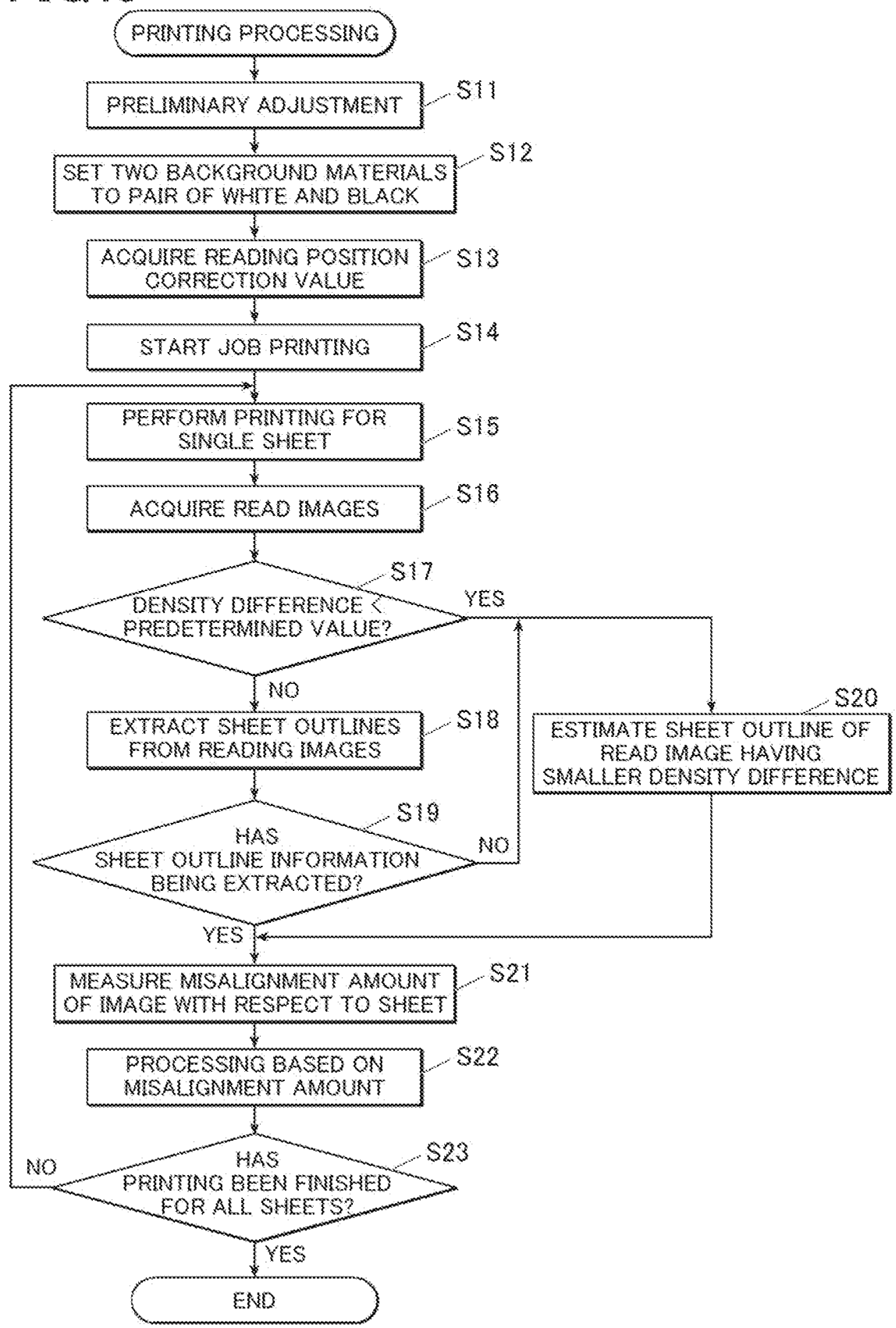
FIG. 6 is a flowchart showing the flow of printing processing executed by the controller in FIG. 1.

FIG. 6 is a flowchart showing the flow of the printing processing executed by the controller 101. The printing processing shown in FIG. 6 is executed by the cooperation of the CPU of the controller 101 and the program stored in the RAM when the job is selected and the start of printing is instructed.

First, the controller 101 performs preliminary adjustment of the image positions on the front and back sides, respectively (Step S11).

The preliminary adjustment is an image position adjustment performed prior to printing based on the job so that a printout with the image printed at the correct position on the sheet is obtained from the beginning of printing. This image position adjustment performed prior to printing based on the job may be performed for sheet trays having sheets replaced at least at timings immediately after replacement of sheets in sheet trays 105a to 105c and prior to the execution of the job, and need not be performed prior to the execution of every job.

Figure 7:
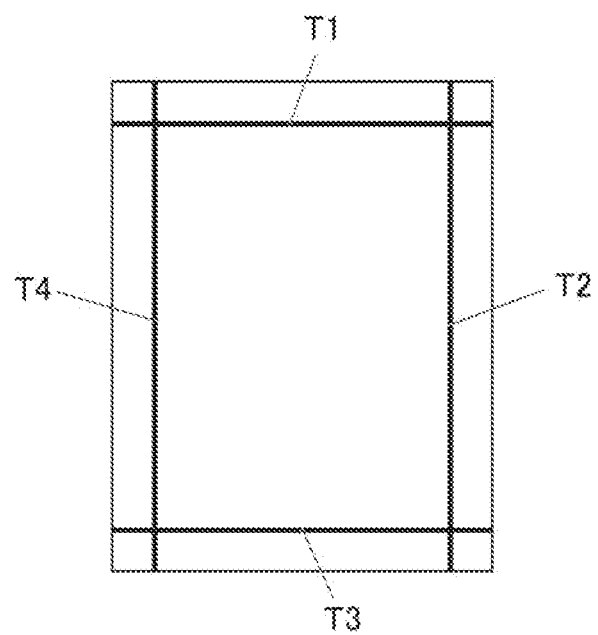
FIG. 7 is a figure showing an example of position adjustment marks used in preliminary adjustment.

In the preliminary adjustment, first, the image former 150 prints the position adjustment marks (called Tombo) T1 to T4 shown in FIG. 7 on the front and back sides of the sheet by placing the position adjustment marks on inner sides of the four edges (sides) of the sheet of the type used for printing of the job by a preset distance (e.g., 10 mm from the sheet edge). The printed matter is read by the reader 170a and the reader 170b, and each of the obtained read images is analyzed by the image analyzer 190 to extract the sheet outline and to obtain the positional relationship (distance) between the sheet edge and the position adjustment mark T1 to T4. Then, for each of the front and back sides, the image analyzer 190 calculates the adjustment values of the plurality of adjustment items so that the distance between the sheet edge and the position adjustment mark T1 to T4 (the position adjustment mark facing each sheet edge) becomes a predetermined distance, and stores them in the storage 104.

Here, depending on the color of the sheet to be adjusted, the controller 101 sets the background surfaces of the background materials 171a and 171b facing the reader 170a and the reader 170b, respectively, to the black surface 1711 or the white surface 1712 before reading. For example, in the case of white sheet, the black surface 1711 is set as the background surface, and in the case of black sheet, the white surface 1712 is set as the background surface. In the case of other sheet colors, the black surface 1711 or the white surface 1712, whichever is easier to read or more readable (e.g., whichever has a larger density difference from the sheet) is selected as the background surface. In the case of black sheet, as for the color tone of the mark to be printed on the sheet, it is preferable to use a color material that can be easily distinguished from the sheet, such as white toner or white ink. Also, in step S11, a background surface of a same color may be set for the background materials 171a and 171b.

In order to improve the measurement accuracy and stability, the preliminary adjustment may be repeated multiple times. In addition, a plurality of printed matters with the above-mentioned position adjustment marks T1 to T4 may be printed, adjustment values may be calculated for each of the printed matters, and the average values thereof may be used.

The adjustment items to be calculated in the image position adjustment including the preliminary adjustment include the vertical and horizontal magnifications, the vertical and horizontal image shifts, the rotation, the skew, the vertical trapezoid, the horizontal trapezoid, the curvature, and the curvature position. The adjustment values for these adjustment items can be obtained independently. Among the above adjustment items, the image positions of the four corners can be adjusted by adjusting the magnifications, image shifts, rotation, skew, vertical trapezoid, and horizontal trapezoid adjustment items. In addition, the curvature and curvature position are used to adjust image distortion, and by using these items together, more advanced image position adjustment is possible.

Figure 8A:
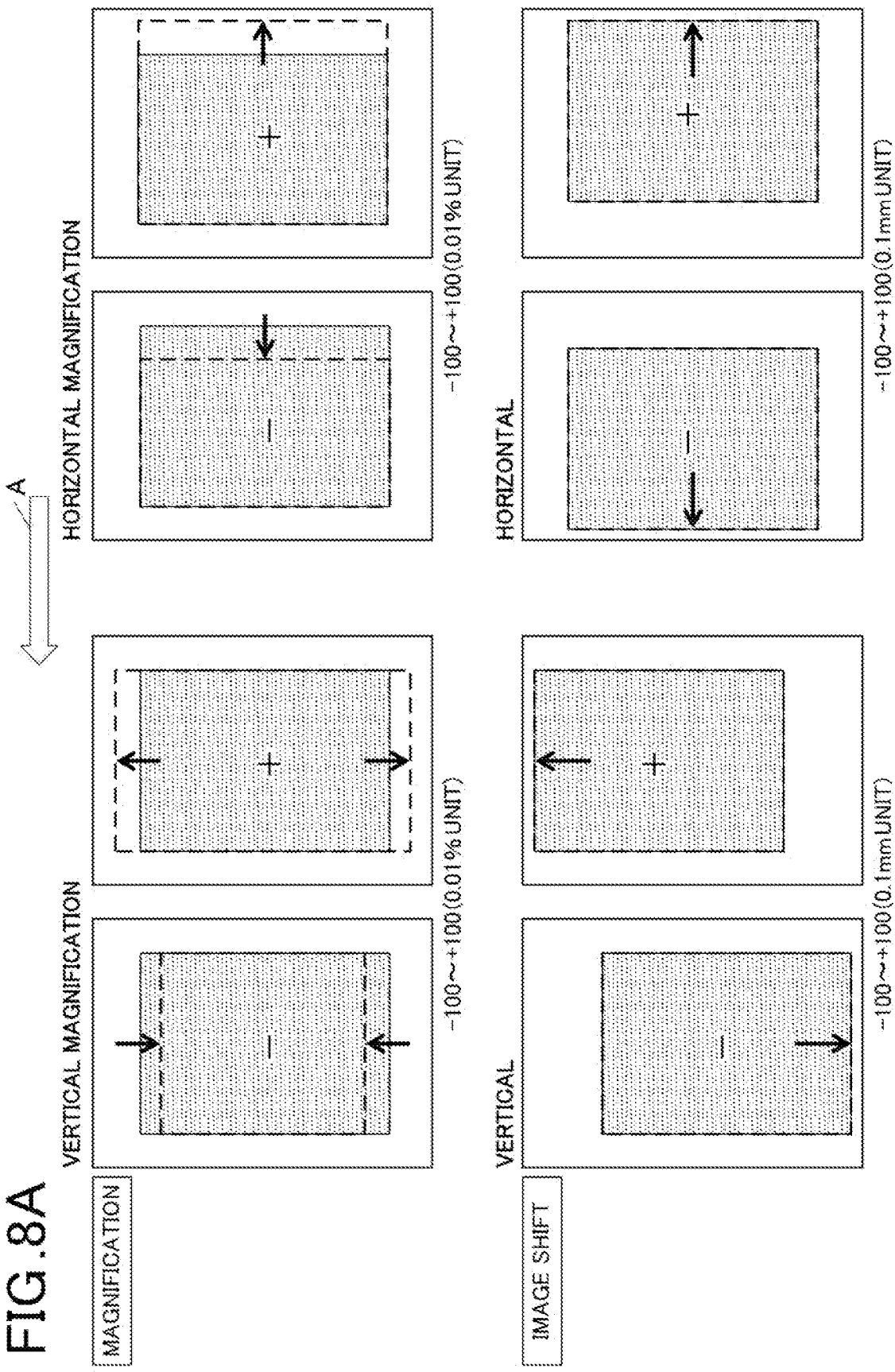
FIG. 8A is a view showing the range of adjustment values and adjustment images for each adjustment item of vertical magnification, horizontal magnification, vertical image shift, and horizontal image shift.
Figure 8B:
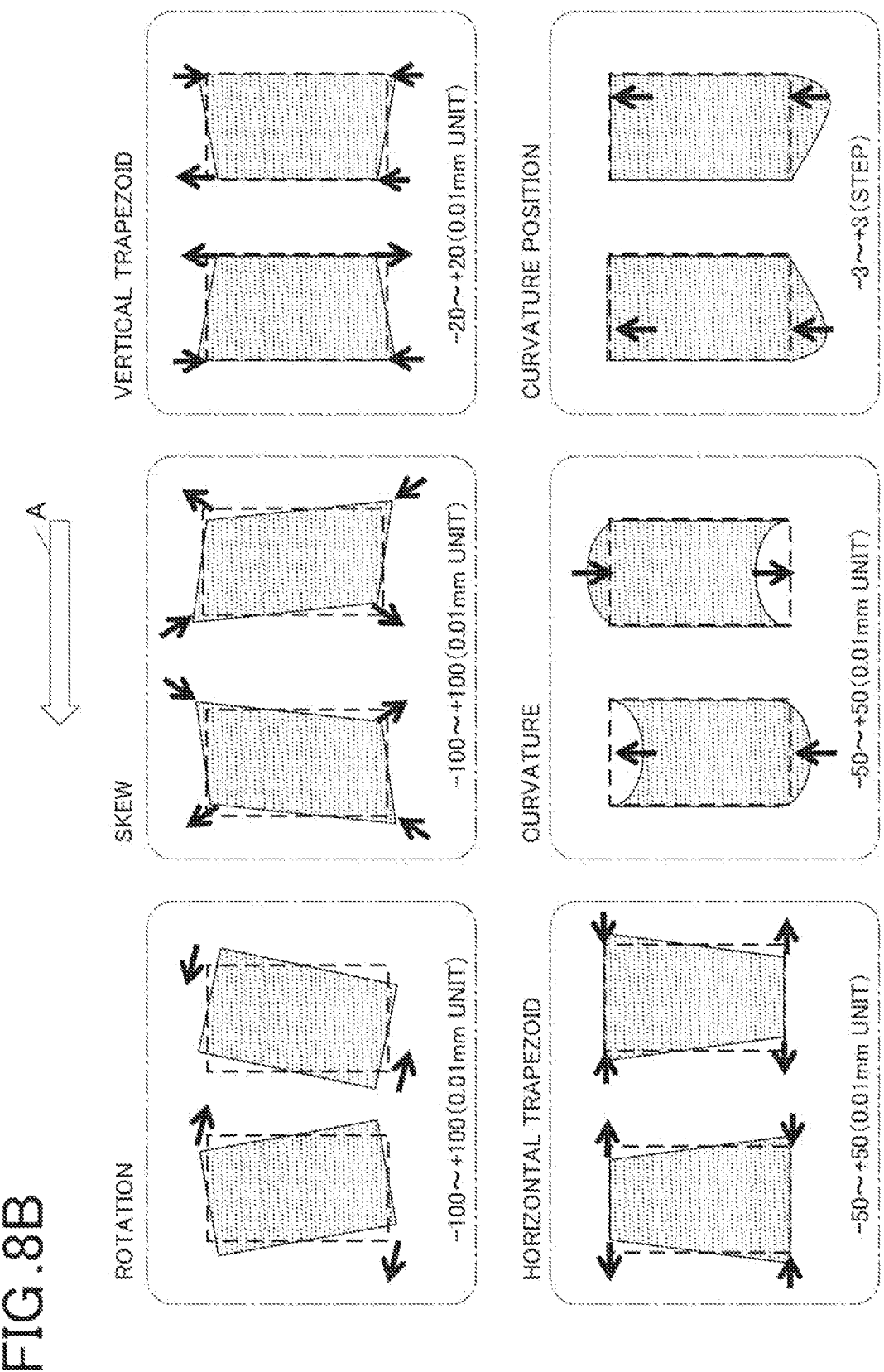
FIG. 8B is a view showing the range of adjustment values and adjustment images for each adjustment item of rotation, skew, vertical trapezoid, horizontal trapezoid, curvature, and curvature position.

FIG. 8A shows the range of adjustment values and adjustment image for each of the following adjustment items: vertical magnification, horizontal magnification, vertical image shift, and horizontal image shift. FIG. 8B shows the range of adjustment values and adjustment image for each of the following adjustment items: rotation, skew, vertical trapezoid, horizontal trapezoid, curvature, and curvature position. The thick arrow A in FIG. 8A and FIG. 8B indicates the sheet conveyance direction, the solid line indicates the sheet, the dotted line indicates the target image position, the hatch indicates the current image position, and the thin arrow indicates the direction in which the image moves due to the adjustment. As for the image shift in FIG. 8A, since it is difficult to see both the current image position and the target image position when both of them are shown, the current image position and the target image position are shown as the same and only the direction in which the image moves due to the adjustment is shown in the figure. In FIG. 8B, the solid line indicating the sheet is omitted.

In this embodiment, the preliminary adjustment is described as automatically acquiring the adjustment value for each adjustment item shown in FIGS. 8A and 8B by reading the sheet on which the position adjustment marks T1 to T4 are printed with the reading unit 170 and analyzing the obtained read image with the image analyzer 190. However, it is also possible to acquire the value for each adjustment item by accepting, from the operation display unit 103, the input of the adjustment value for each adjustment item determined by the user visually observing the sheet on which the position adjustment marks T1 to T4 are printed.

In the preliminary adjustment of step S11, color adjustment (calibration and output sheet density adjustment) as well as image position adjustment may be performed.

Figure 9:
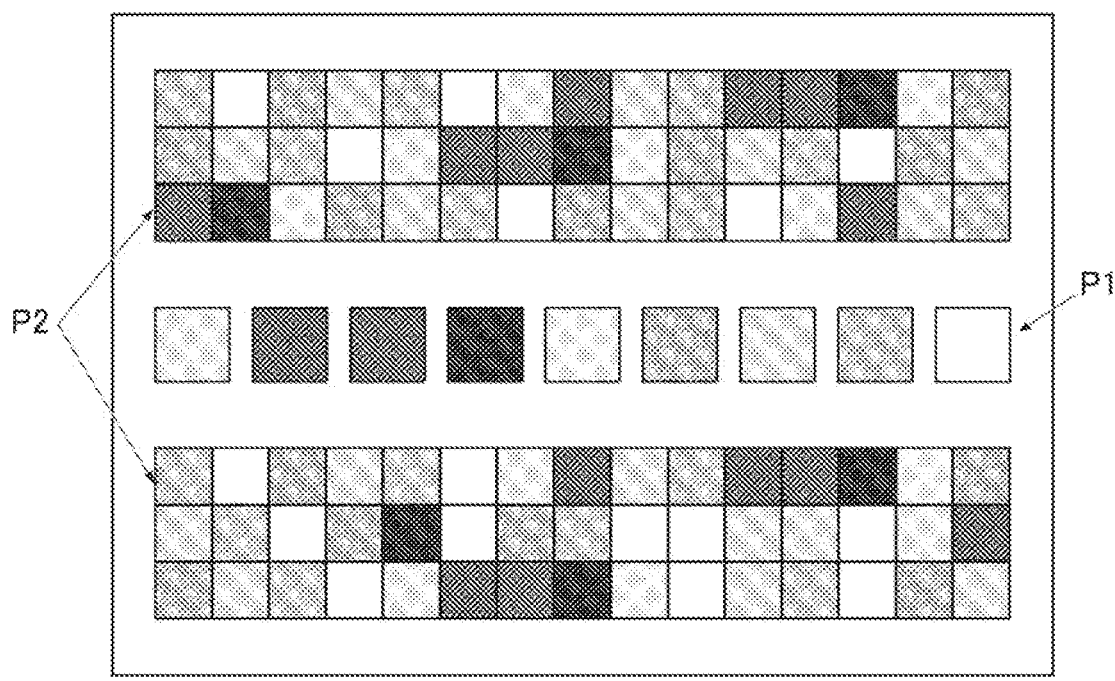
FIG. 9 is a view showing an example of a calibration chart.

Calibration during printing is performed, for example, to adjust the color tone of the finished product to be equivalent to that of offset printing with ink when printing is performed with electrophotographic toner based on image data created for printing with offset printing ink. For example, a calibration chart (single-sided chart) consisting of a plurality of patches with predetermined combinations of tone values, as shown in FIG. 9, is printed on a sheet, and by measuring the printing results, a so-called color profile is created to adjust the color tone of the printed image. In printing based on the job, the color tone of the printed image is managed by applying the created color profile. There are many existing methods for managing the color tone, but they all assume that the patches on the calibration chart are read correctly. Therefore, a dedicated colorimeter 180, which can obtain correct readings (reading values), is placed near the reading unit 170 (in this case, the reader 170b). The patch P1 is read by the colorimeter 180 and the reader 170b, which reads the printing surface during one side printing, and a conversion formula is calculated to convert the readings of the reader 170b into the readings of the colorimeter 180. In addition, the patches P2, which contain more various tone values, are read by the reader 170b, and based on these measured values and the conversion formula described above, calibration is performed, a color profile is generated, and stored in the storage 104.

In this calibration, it is important that the surface of the background material 181 facing the colorimeter 180 and the background surface of the background material 171b are white and coincide with each other. Therefore, the controller 101 performs the above calibration with the color of the background surface of the background material 171b set to white.

The color management of electrophotographic printed matter is usually controlled by the toner amount of the toner image transferred onto the intermediate transfer belt, which is detected by an image sensor installed to face the intermediate transfer belt. However, in this case, the actual printed results will vary depending on the transfer efficiency when the toner image is transferred to the sheet and the quality of the toner and color appearance on the sheet. Therefore, for more accurate color management, there is a method of reading the image printed on the sheet with the reading unit 170 and managing the color of the printed matter based on the tone values. This is called output sheet density adjustment.

The output sheet density adjustment is carried out in the following three steps.

<Step A>

First, as in the calibration described above, the same color patch (patch P1) on the calibration chart is read by the colorimeter 180 and the reader 170b, and the readings are compared to generate a conversion formula for converting the readings of the reader 170b into the readings of the colorimeter 180.

<Step B>

Using the conversion formula of Step A, the reading results of patch P2 of the calibration chart by the reader 170b is converted, and a tone conversion table (or a spatial LUT (look-up table) with a similar effect) is created based on the measurement results obtained. This is the color management state before the job starts.

<Step C>

During execution of the job, a color patch for inspection is printed on the periphery of the image (cut-off area) on the sheet, or an area that can be used for color inspection is designated in the image (image content) to be printed by the job. The color patch for inspection or the designated area is read by the reader 170b, and the process conditions at the time of printing and the tone conversion characteristics of the printed image are changed (tone conversion table or spatial LUT is changed) to reduce the variation of the reading result, and color tone management is performed.

In step S11 of FIG. 6, step A to step B are performed in the case where output sheet density adjustment is performed, and step C is performed during the job.

The goal of output sheet density adjustment is to maintain the current color tone (e.g., to suppress changes in color tone during a job), regardless of the current color tone. For this reason, the background surface of the background material 171b may be white or black, but it is a requirement that the same one is always used from Step A to Step C. In Step C, during a duplex printing job, an area of image content may be specified to calculate the variation of the reading result, and if the background color of the background material 171b is white, the image on the back side may be captured and become noise. In general, since a white sheet is often used, it is preferable to cause the background material 171b of the reader 170b, which is used for both single-sided and duplex printing (to read the printed surface (front) of one side printing), to be black to facilitate reading the outline of the white sheet. Therefore, when implementing output sheet density adjustment, it is preferable to set the background surface of the background material 171b to black and the background surface of the background material 171a to white.

Next, the controller 101 controls the density composition of the background materials 171a and 171b, and sets one background surface to the black surface 1711 and the other to the white surface 1712 (step S12).

For example, in step S12, the background surface of the background material 171a may be set to black and the background surface of the background material 171b may be set to white, or vice versa.

For example, a color surface (e.g., black surface 1711) having a large density difference from the sheet color (e.g., white) that accounts for a larger number of printed sheets can be set for the background material (background material 171b in this embodiment) facing the reader (reader 170b in this embodiment) that faces the printing surface of one side printing.

Furthermore, for example, the density of the background surface of the sheet of the background material 171a and the background material 171b may be controlled according to the adjustment function which measures the image positional shift (misalignment) on each of the sheets at the time of the job and which is performed simultaneously or in conjunction with the job.

For example, when implementing the output sheet density adjustment, the background surface of the background material 171b facing the reader 170b that reads the printed surface during one side printing is set to black and the other background surface is set to white, as described above.

When calibration with the colorimeter 180 is used together, the background surface of the background material 171b facing the reader 170b that reads the printed surface during one side printing is set to white and the other to black, in accordance with the time of implementing the calibration.

For example, the density of the background surfaces of the background materials 171a and 171b may be controlled based on the configuration of the sheet set in the sheet tray used in the job among the sheets set in the sheet trays 105a to 105c.

For example, a sensor for measuring the sheet color may be provided in the image forming apparatus 100 (e.g., in each sheet tray), and the density of the background surfaces of the background materials 171a, 171b may be controlled based on the measurement results of the sensor in the sheet tray used in the job. Instead of the above sensor, the sheet color (e.g., the density converted from each RGB tone value) may be measured using the tone values of the images read by the readers 170a and 170b. Also, the density composition of the background surfaces of the background materials 171a and 171b may be controlled based on the specification of the density composition of the background materials 171a and 171b by the user from the input interface 103b.

Since all the sheets set in the sheet trays 105a to 105c may be the same, the controller 101 may control the density composition of the background surfaces of the background materials 171a and 171b so that they have different densities (white or black) from each other when the difference in density between the sheets set in the plurality of sheet trays used in the job among the sheet trays 105a to 105c is large (larger than a predetermined threshold). On the other hand, for example, if all the sheets set in the sheet trays 105a to 105c are white, both the background material 171a and the background material 171b may be set to black. In addition, when the difference in density between the sheets set in the plurality of sheet trays used in the job among the sheet trays 105a to 105c is large (larger than a predetermined threshold), the controller 101 can display a message on the display 103a prompting the user to set the density of the background surface of each of the background material 171a and the background material 171b to a different density.

Next, the controller 101 acquires the reading position correction value between the reader 170a and the reader 170b from the storage 104 (step S13).

Next, the controller 101 starts printing based on the job (Step S14) and performs printing for one sheet (Step S15).

In Step S15, the controller 101 first applies image processing (e.g., rasterization processing, color conversion using a color profile stored in the storage 104, processing based on a tone conversion table, etc.) to the image data to be printed. Next, the controller 101 controls the image former 150 and the conveyance unit 106, etc. to print, on the sheet, the image having the image content based on the image data in the printing area on the sheet and having the image with the position adjustment marks T11 to T14 (see FIG. 2) added to the margins of the sheet (a predetermined distance from the edge of the sheet), and to fix the image to the sheet by the fixing unit 160. At this time, the position of the image to be printed on the sheet is adjusted based on the adjustment value of each adjustment item stored in the storage 104. In the case of duplex printing, the controller 101 controls the conveyance unit 106 and the image former 150 to perform duplex printing.

Next, the controller 101 causes the reading unit 170 to read the printed sheet (printed matter) and obtain read images including the sheet outlines and the background materials (step S16).

Here, the read images are obtained in tone values of R, G, and B. The read image from the reader 170a and the read image from the reader 170b are acquired.

Next, the controller 101 causes the image analyzer 190 to perform analysis to determine whether the density difference between the density of the sheet and the density of the background (background material) in either one of the two acquired read images is smaller than a predetermined value (step S17).

For example, since the background material should have been read at the end of the read image, the tone value at the end of the read image (the average of the tone values around the end) is acquired as the density of the background. For example, when calculating the reading position correction value, the distance from the end of the read image to the sheet outline, etc., is acquired, and the tone value (average value) at the point where the distance from the end is slightly farther than the acquired distance is acquired as the sheet density. Then, by comparing the acquired tone values, the density difference between the sheet density and the background density is calculated. The predetermined value to be used in step S17 is a value obtained experimentally or empirically such that the extraction of sheet outline information may fail if the density difference is smaller than the predetermined value.

One of the background surfaces of the background material 171*a* and the background material 171*b* is set to black and the other to white, which eliminates the possibility that the difference between the density of the sheet and the density of the background is smaller than the predetermined value in both of the two read images and the possibility that the sheet outline information cannot be extracted.

Here, the optical density based on reflectance may be used as the density, but in this embodiment, the tone value output from the reading unit 170 (the tone value of the read image) is used as the density. Specifically, among the tone values of the three channels (R, G, and B) of the read image, the tone value of the channel in which the difference between the tone value of the background (background material) and the tone value of the sheet is the largest is used as the density.

If it is determined that the density difference between the density of the sheet and the density of the background material in both of the two read images is a predetermined value or greater (step S17; NO), the controller 101 causes the image analyzer 190 to perform the process of extracting the sheet outline information from the two read images (step S18).

For example, a search is performed from the ends of the four sides of the read images, and when the edge with a density difference from each end that is a predetermined value or more is detected, the information of the detected edge is extracted as sheet outline information. Even in the case where the density difference between the sheet density and the background density is determined to be the predetermined value or more, there may be cases where the calculation of the density difference fails, for example, when the density difference between the sheet density and the background density is incorrectly calculated from within the image content. In this case, the sheet outline information may not be extracted.

Next, the controller 101 determines whether or not the sheet outline information has been extracted from the two read images (Step S19).

If it is determined that the sheet outline information has been extracted from the two read images (Step S19; YES), the controller 101 shifts to Step S21.

On the other hand, when it is determined in step S17 that the density difference between the density of the sheet and the density of the background in one of the read images is smaller than a predetermined value (step S17; YES), or when it is determined in step S19 that the sheet outline information of one of the read images has not been extracted (step S19; NO), the controller 101 uses the image analyzer 190 to acquire the sheet outline information of the read image for which the density difference between the density of the sheet and the density of the background is smaller or for which the sheet outline information was not extracted, by estimating it based on the sheet outline information of the other read image (Step S20), and then moves to Step S21.

In Step S20, for example, the coordinates of each vertex of the sheet outline information of the other read image are converted to the position of the mirror image and further shifted by $\Delta x$ and $\Delta y$ to estimate the sheet outline information of the one read image (the one read image with the smaller difference in density between the density of the sheet and the density of the background material or the one read image for which the sheet outline information was not extracted). The correction values $\Delta x$ and $\Delta y$ are based on the sheet size and type.

In step S21, the controller 101 measures the misalignment amount of the image with respect to the sheet using the extracted or estimated sheet outline information (step S21).

For example, the controller 101 causes the image analyzer 190 to acquire the distances between the four sheet edges of the sheet outline and the corresponding position adjustment marks T11 to T14. Then, the misalignment amount of the image with respect to the sheet is measured based on the acquired distances.

Next, the controller 101 implements a process based on the misalignment amount (Step S22).

For example, if the misalignment amount exceeds a predetermined threshold, the sheet read in step S16 is output from the sheet waste path 106*c* as a waste sheet. If the misalignment amount is equal to or less than the predetermined threshold, the sheet read in step S16 is output from the sheet discharge path 106*b* for printed matter.

Based on the calculated misalignment amount, the adjustment value of each adjustment item for the image position to be acquired may be calculated and updated.

When the output sheet density adjustment is performed, for example, based on the color of a predetermined area of the read image, the process conditions for printing and the tone conversion curve are changed.

Next, the controller 101 determines whether printing of all sheets has been completed or not, and if it is determined that printing of all sheets has not been completed (step S23; NO), it returns to step S15 and executes the processes of step S15 to step S22 for the next sheet.

When it is determined that printing of all sheets has been completed (Step S23; YES), the controller 101 ends the printing processing.

In the above printing processing, the estimation of the sheet outline information is performed when the density difference between the sheet and the background in the read image is smaller than a predetermined value. However, for example, the sheet outline information may be always estimated and the first sheet outline information candidate based on the estimation and the second sheet outline information candidate based on the actual measurement extracted from the read image may be compared so that the second sheet outline information candidate is adopted as the sheet outline information if the difference between the candidates is smaller than a predetermined value and the first sheet outline information candidate is adopted as the sheet outline information if the difference is large, which is determined that the actual measurement is wrong.

In the above-described printing processing, the case where position adjustment marks are printed and the misalignment amount of the image with respect to the sheet is measured based on the distance between the position adjustment marks and the sheet outline, but the method of measuring the misalignment amount is not limited thereto. For example, the controller 101 may predict, based on the image data of the job, the printing result when the image based on the image data is printed on the sheet to be used for printing, generate an image representing the printing image as the comparison image information, and calculate the misalignment amount on the basis of the positional relationship between the image content and the sheet outline in the generated comparison image information and the positional relationship between the image content and the sheet outline in the read image obtained by reading the print result of actually printing the image based on the image data of the job on the sheet with the reading unit 170.

As explained above, according to the image forming apparatus 100, the controller 101 acquires two read images by causing the background material 171a and the background material 171b to have different densities, and acquires the sheet outline information from one of the acquired read images by estimating the sheet outline information on the basis of the sheet outline information of the other of the acquired read images.

Therefore, even if the sheet outline information cannot be extracted from the read image taken from one of the readers 170a and 170b, the sheet outline information can be extracted from the other of the readers 170a and 170b since the background material 171a and the background material 171b are configured with different densities. Since the sheet outline information of the one of the readers 170a and 170b is estimated from the sheet outline information extracted from the read image of the other of the readers 170a and 170b, it is possible to easily and reliably acquire the sheet outline information without switching the background material during a job.

The description in the above embodiment is a preferred example of the image forming apparatus of the present invention, and the present invention is not limited thereto.

The above embodiment takes, as an example, a case where the image inspection apparatus of the present invention, which obtains sheet outline information from a read image obtained by reading a sheet having an image printed thereon and measures misalignment of the printed image based on the obtained sheet outline information, is integrally configured with the image forming apparatus 100 (incorporated in the image forming apparatus 100). However, the image inspection apparatus of the present invention may be configured to be separate from the image forming apparatus.

Figure 10:
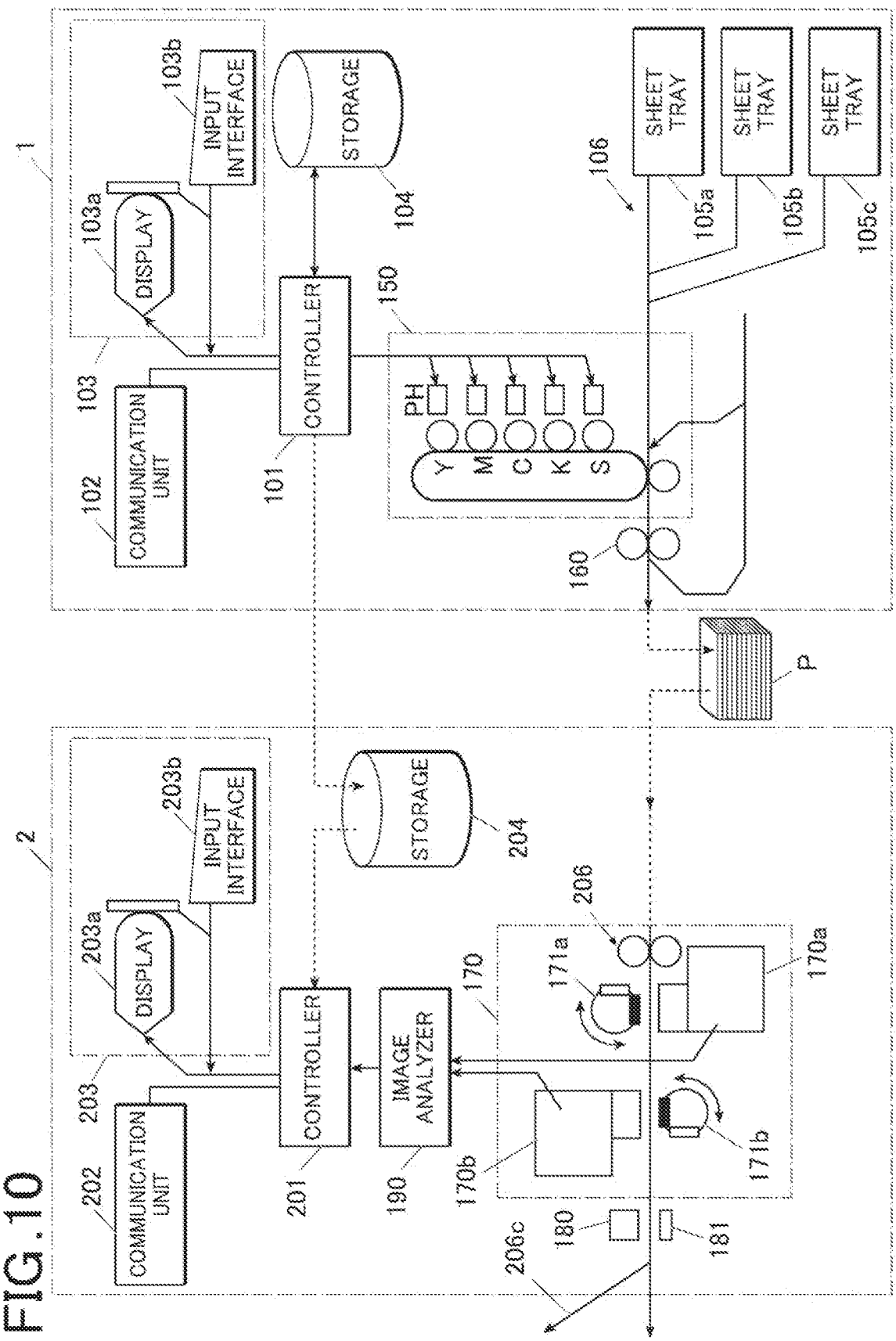
FIG. 10 is an example of a configuration in which the image forming apparatus and an image inspection apparatus are separate units.

FIG. 10 shows an example of a configuration in which the image forming apparatus (image forming apparatus 1) and the image inspection apparatus (image inspection apparatus 2) are configured separately. As shown in FIG. 10, the image inspection apparatus 2 is configured with a controller 201, a communication unit 202, a display 203a, an input interface 203b, a storage 204, a conveyance unit 206, and the like, in addition to the reading unit 170, the colorimeter 180, and the image analyzer 190 shown in FIG. 1.

As shown in FIG. 10, the image inspection apparatus 2 transfers a sheet one by one from a sheet bundle P of sheets (printed matters) on which an image has been printed by the image forming apparatus 1 to the reading unit 170, and implements reading of the sheet on which the image has been printed. At that time, the controller 201 receives the necessary information among the job information (job setting information) used for printing in the image forming apparatus 1 from the image forming apparatus 1 via the communication unit 202 and stores the information in the storage 204, in time for analysis of the read images by the image analyzer 190 prior to or during the measurement of misalignment based on the read images. The controller 201 performs image analysis of the read images acquired by the reading unit 170 by the image analyzer 190 based on the received job information, and measures the misalignment amount using the same method as in the above embodiment (the method described in steps S17 to S22 of FIG. 6). The job information includes multiple pieces of information necessary for measuring the misalignment, such as information on the sheet trays 105a to 105c used in the job of the image forming apparatus 1, attributes such as the color, size, and sheet type of the sheet loaded in each of the sheet trays, the total number of printed sheets, and information on adjustment functions performed simultaneously or in conjunction with the job. The control of the density composition of the background materials 171a and 171b during image reading and the analysis control is the same as that of the image inspection apparatus incorporated in the image forming apparatus 100 described in the above embodiment, but since printing has already been completed, here control is performed to determine the good or bad printing result based on the measured misalignment amount, and discharge the defective print to the sheet discharge path 206c as a "waste sheet". In addition, since it is necessary to reprint the print result that has been rejected as the waste sheet, reprint job information is generated for reprinting. The reprint job information may include an adjustment amount for correcting, for example, image misalignment, based on the factors of defective printing.

In FIG. 10, the image inspection apparatus 2 conveys, to the reading unit 170, the sheets one by one from the sheet bundle P of sheets (printed matters) on which images have been printed by the image forming apparatus 1, to perform reading of the sheets on which images have been printed and analysis of the read images, etc. However, it is also possible to directly and sequentially convey the sheets on which images have been printed by the image forming apparatus 1 to the reading unit 170 to perform reading of the sheets on which images have been printed and analysis of the read images, etc.

In addition, when density is used in the above embodiment, color may be used instead of density.

The above description discloses an example of using a non-volatile semiconductor memory or hard disk as a computer readable medium storing a program for executing each processing, but the present invention is not limited to this example. As other computer readable media, it is also possible to apply portable recording media such as CD-ROM. A carrier wave may also be applied as a medium for providing program data via a communication line.

In addition, the detailed configuration and detailed operation of each component forming the image inspection apparatus can be changed as necessary without departing from the scope of the invention.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image inspection apparatus comprising:
a first reader that acquires a first read image by reading one side of a sheet so as to include a background, the sheet having an image printed thereon;
a first background material that is provided at a position which serves as the background of the sheet in reading of the sheet by the first reader;
a second reader that acquires a second read image by reading the other side of the sheet so as to include a background;
a second background material that is provided at a position which serves as the background of the sheet in reading of the sheet by the second reader; and
a hardware processor that acquires end information of the sheet from the first read image and the second read image, wherein
the hardware processor acquires the first read image and the second read image in a state where each of the first background material and the second background material has a different density, and acquires end information of one read image that is one of the first read image and the second read image by performing estimation of the end information of the one read image based on end information of the other of the first read image and the second read image.

2. The image inspection apparatus according to claim 1, wherein the end information comprises a sheet edge.

3. The image inspection apparatus according to claim 1, wherein the hardware processor measures misalignment of the image with respect to the sheet based on the acquired end information of the sheet.

4. The image inspection apparatus according to claim 1, wherein the hardware processor performs the estimation in response to failure to extract the end information from the one of the first read image and the second read image.

5. The image inspection apparatus according to claim 1, wherein the hardware processor performs the estimation in response to a difference between a density of the sheet and a density of the background of the sheet being smaller than a predetermined value in the one of the first read image and the second read image.

6. The image inspection apparatus according to claim 1, wherein a tone value of the first read image or the second read image is used as the density.

7. The image inspection apparatus according to claim 1, wherein the hardware processor acquires the first read image and the second read image by reading both sides of the sheet with the first reader and the second reader in a state where each of the first background material and the second background material has a same density, and performs the estimation based on difference information between the end information extracted from the first read image and the end information extracted from the second read image.

8. The image inspection apparatus according to claim 1, wherein the hardware processor acquires the first read image and the second read image by reading both sides of the sheet with the first reader and the second reader, and performs the estimation based on accumulative information that is obtained by accumulating difference information between the end information extracted from the first read image and the end information extracted from the second read image.

9. The image inspection apparatus according to claim 1, wherein
the hardware processor compares a first end information candidate that is acquired for the one read image and that is based on the estimation with a second end information candidate that is extracted from the one read image and that is not based on the estimation, and
the hardware processor adopts the second end information candidate as the end information of the one read image in response to a difference between the first end information candidate and the second end information candidate being smaller than a predetermined value, and adopts the first end information candidate as the end information of the one read image in response to the difference being the predetermined value or more.

10. The image inspection apparatus according to claim 1, wherein the hardware processor controls a density composition of the first background material and the second background material.

11. The image inspection apparatus according to claim 10, further comprising an input interface capable of specifying the density composition of the first background material and the second background material, wherein
the hardware processor controls the density composition of the first background material and the second background material based on specification by the input interface.

12. The image inspection apparatus according to claim 10, wherein
the hardware processor measures misalignment of the image with respect to the sheet for each sheet on which an image has been printed with an image forming apparatus by execution of a print job, and
the hardware processor controls the density composition of the first background material and the second background material in accordance with an adjustment function that is performed simultaneously or in conjunction with the print job.

13. The image inspection apparatus according to claim 12, wherein the hardware processor causes one of the first background material and the second background material to be black and causes the other of the first background material and the second background material to be white in performing output sheet density adjustment, the one of the first background material and the second background material facing a reader that reads a printed side in one-side printing.

14. The image inspection apparatus according to claim 12, wherein the hardware processor causes one of the first background material and the second background material to be white and causes the other of the first background material and the second background material to be black in performing calibration by a colorimeter, the one of the first background material and the second background material facing a reader that reads a printed side in one-side printing.

15. The image inspection apparatus according to claim 10, wherein
the hardware processor measures misalignment of the image with respect to the sheet for each sheet on which an image has been printed with an image forming apparatus by execution of a print job, and
the hardware processor controls the density composition of the first background material and the second background material based on a configuration of a sheet that is set in a sheet tray used in the print job in the image forming apparatus.

16. The image inspection apparatus according to claim 15, wherein the hardware processor performs control to cause each of the first background material and the second background material to have the different density in response to a density difference of sheets exceeding a threshold that is determined in advance, the sheets being set in multiple sheet trays used in the print job in the image forming apparatus.

17. The image inspection apparatus according to claim 15, wherein the hardware processor causes a display to display a message prompting an operator to cause each of the first background material and the second background material to have the different density in response to a density difference of sheets exceeding a threshold that is determined in advance, the sheets being set in multiple sheet trays used in the print job in the image forming apparatus.

18. The image inspection apparatus according to claim 15, wherein the hardware processor controls the density composition of the first background material and the second background material based on a color measurement result of the sheet that is set in the sheet tray used in the print job by a sensor capable of measuring a color of a sheet set in each sheet tray in the image forming apparatus.

19. An end information acquisition method in an image inspection apparatus, the method comprising acquiring a first read image and a second read image in a state that each of a first background material and a second background material has a different density, and acquiring end information of one read image which is one of the first read image and the second read image by estimating the end information of the one read image based on end information of the other of the first read image and the second read image, wherein the image inspection apparatus includes:
- a first reader that acquires the first read image by reading one side of a sheet having an image printed thereon so as to include a background;
- the first background material that is provided at a position which serves as the background of the sheet in reading the sheet by the first reader;
- a second reader that acquires the second read image by reading the other side of the sheet so as to include a background; and
- the second background material that is provided at a position which serves as the background of the sheet in reading the sheet by the second reader, and
- a hardware processor that acquires the end information of the sheet from the first read image and the second read image.

\* \* \* \* \*